United States Patent [19]

Schäfer et al.

[11] 4,134,699
[45] Jan. 16, 1979

[54] COUPLING FOR SHAFTS AND THE LIKE

[75] Inventors: Horst-Dieter Schäfer, Willich; Paul Loosen, Krefeld; Ulrich Klören, Krefeld; Hans-Martin Thiele, Krefeld, all of Germany

[73] Assignee: Ringfeder GmbH, Krefeld, Germany

[21] Appl. No.: 778,187

[22] Filed: Mar. 16, 1977

[30] Foreign Application Priority Data

Mar. 13, 1976 [DE] Fed. Rep. of Germany ....... 2610720

[51] Int. Cl.$^2$ .............................................. F16B 7/00
[52] U.S. Cl. ..................................... 403/13; 403/314; 403/336
[58] Field of Search ............... 403/335, 336, 337, 338, 403/314, 16, 6, 13, 14, 370

[56] References Cited

U.S. PATENT DOCUMENTS

| 355,062 | 12/1886 | Cook | 403/314 |
|---|---|---|---|
| 364,537 | 6/1887 | Miller | 403/314 |
| 1,059,560 | 4/1913 | Parker | 403/13 |
| 1,318,455 | 10/1919 | MacDonald | 403/16 |
| 1,393,064 | 10/1921 | Woodward | 403/314 |
| 1,978,814 | 10/1934 | Myers | 403/6 |
| 2,460,631 | 2/1949 | Fawick | 403/16 |
| 3,210,104 | 10/1965 | Davis et al. | 403/245 |

FOREIGN PATENT DOCUMENTS 86808  6/1956 Norway ................................. 403/336

Primary Examiner—Andrew V. Kundrat
Attorney, Agent, or Firm—Michael J. Striker

[57] ABSTRACT

A coupling for shafts and the like, comprising a sleeve having a passage adapted to receive the end portions of two aligned shafts, an outer circumferential surface having two axially spaced sections which conically diverge towards each other, and a radial flange intermediate the sections; a pair of pressure rings each surrounding one of the sections and having a conically tapering inner circumferential surface complementary to the respectively surrounded section; and bolts connecting the pressure rings with the flange and operative for pulling the pressure rings axially towards each other and towards the flange to thereby compress the sleeve radially inwardly into frictional engagement with shaft end portions located in the passage.

7 Claims, 4 Drawing Figures

COUPLING FOR SHAFTS AND THE LIKE

BACKGROUND OF THE INVENTION

This invention relates to a coupling for shafts and the like.

It is often necessary to couple the end portions of axially aligned shafts to one another. The prior-art proposals are not satisfactory, because they are complicated, require precise manufacturing tolerances and in many instances cannot transmit adequate torque.

SUMMARY OF THE INVENTION

It is an object of the invention to overcome these disadvantages and to provide an improved coupling of the type under discussion.

Another object is to provide such a coupling which is simple in construction and very easy to install and remove.

A further object is to provide such a coupling which permits the transmission of higher torque than before.

In keeping with these objects, and with others which will become apparent hereafter, one feature of the invention resides in a coupling for shafts and the like. Briefly stated, such a coupling may comprise a sleeve having a passage adapted to receive the end portions of two aligned shafts, an outer circumferential surface having two axially spaced sections which conically diverge towards each other, and a radial flange intermediate the sections; a pair of pressure rings each surrounding one of the sections and having a conically tapering inner circumferential surface complementary to the respectively surrounded section; and means connecting the pressure rings with the flange and operative for pulling the pressure rings axially towards each other and towards the flange to thereby compress the sleeve radially inwardly into frictional engagement with shaft end portions located in the passage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
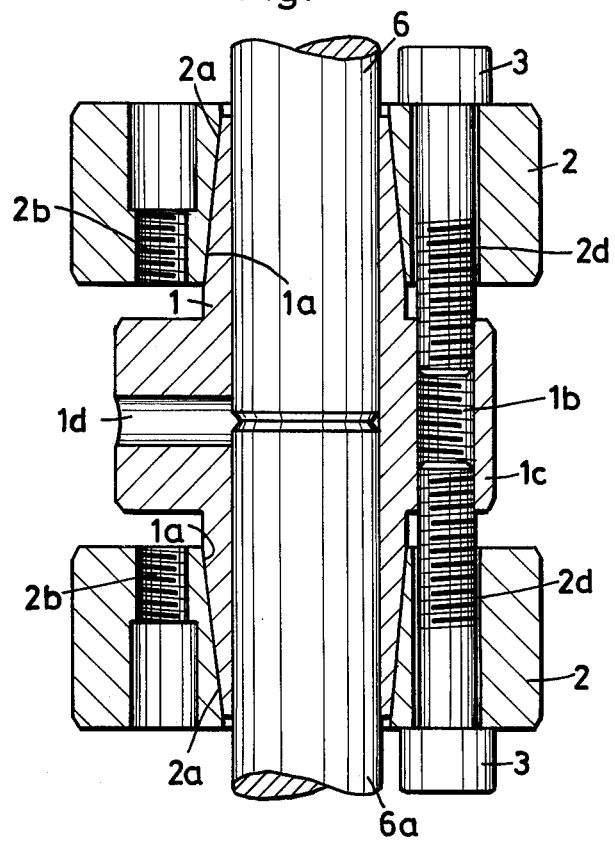
FIG. 1 is a sectional view taken on line II of FIG. 2.
Figure 2:
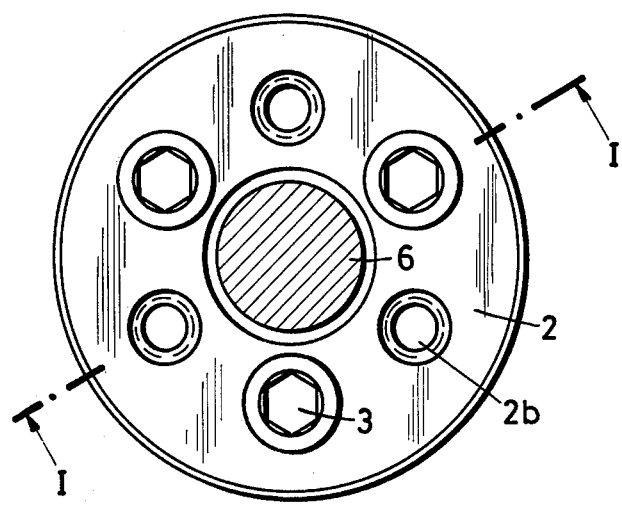
FIG. 2 is an endview of the sleeve in FIG. 1, with one shaft shown in section.

A first embodiment of the invention is shown in FIGS. 1 and 2. The end portions of two axially aligned shafts 6, 6a are to be rigidly connected by means of the coupling having a sleeve 1 in the inner passage of which the shaft end portions are received.

The outer circumferential surface of sleeve 1 has a radial flange 1c and, at opposite axial sides of the same, two surface sections 1a which diverge conically in axial direction towards one another. Each of the sections 1a is surrounded by a pressure ring 2 the inner circumferential surface 2a of which has a conical taper that is mating to that of the surrounded section 1a. Rings 2 are provided with circumferentially spaced smooth holes 2d and flange 1c is provided axially throughgoing circumferentially spaced tapped bores 1b. Bolts 3 have heads which bear upon the axially outwardly facing ends of the rings 2; these bolts extend through the holes 2d and are threaded into the bores 1b. Each bore 1b has two bolts 3 threaded into its opposite ends, one from each ring 2.

To install the coupling the sleeve 1 is pushed into one of the shafts to be connected, e.g., shaft 6; to facilitate proper positioning of sleeve 1 the flange 1c may be provided with a radial bore 1d which is open to the inner passage so that the end of shaft 6 may be observed through it. When this end becomes visible, the bolts 3 for the ring 2 which surrounds the sleeve end that accommodates the shaft 6, are tightened. This draws the ring 2 towards the flange 1c, so that cooperation of the conical surfaces 1a, 2a causes the sleeve to be compressed tightly onto the shaft 6. Thereafter, the end portion of shaft 6a is inserted into the other end of sleeve 1 and the preceding operations are repeated with reference to the other ring 2, so that a rigid torque-transmitting connection is now established between the shafts 6, 6a.

To facilitate removal of the coupling without requiring extraneous equipment it is advisable to provide the rings 2 with some (at least two) circumferentially spaced tapped holes 2b. When the coupling is to be disengaged, the bolts 3 are removed and a requisite number of them is threaded into the holes 2b until the front ends of the bolts 3 lean upon the flange 1c; of course, non-apertured portions of the flange will be located opposite the holes 2b. Further turning of the bolts will then cause the bolts 3 to push the rings 2 axially away from flange 1c and off the sections 1a.

Figure 3:
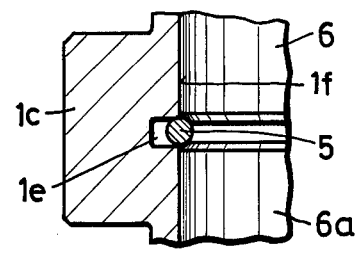
FIG. 3 is a fragmentary sectional view, showing a detail of another embodiment.

FIG. 3 shows an embodiment which should be understood to be identical in all respects with the one in FIGS. 1 and 2. The only exception is an alternative to the bore 1d.

To locate the ends of the shafts 6, 6c the inner surface bounding the passage in sleeve 1 is provided with a circumferentially complete recess 1e in which there is received a circumferentially incomplete spring ring 5. Normally, the ring 5 projects somewhat radially inwardly beyond the surface bounding the passage (as in FIG. 3). The ring 5 is of circular cross-section. When the end of an inserted shaft 6 or 6a abuts the ring 5, the ring acts as a stop and indicates that further relative axial displacement of sleeve and shaft should cease. However, if it is necessary or desired to shift the sleeve 1 on the shaft beyond this point nevertheless, then same additional axial pressure will become radially expanded so that the shaft can enter into the space surrounded by the ring. As this takes place, the ring 5 recedes completely into groove 1e where it remains until the shaft is withdrawn.

Figure 4:
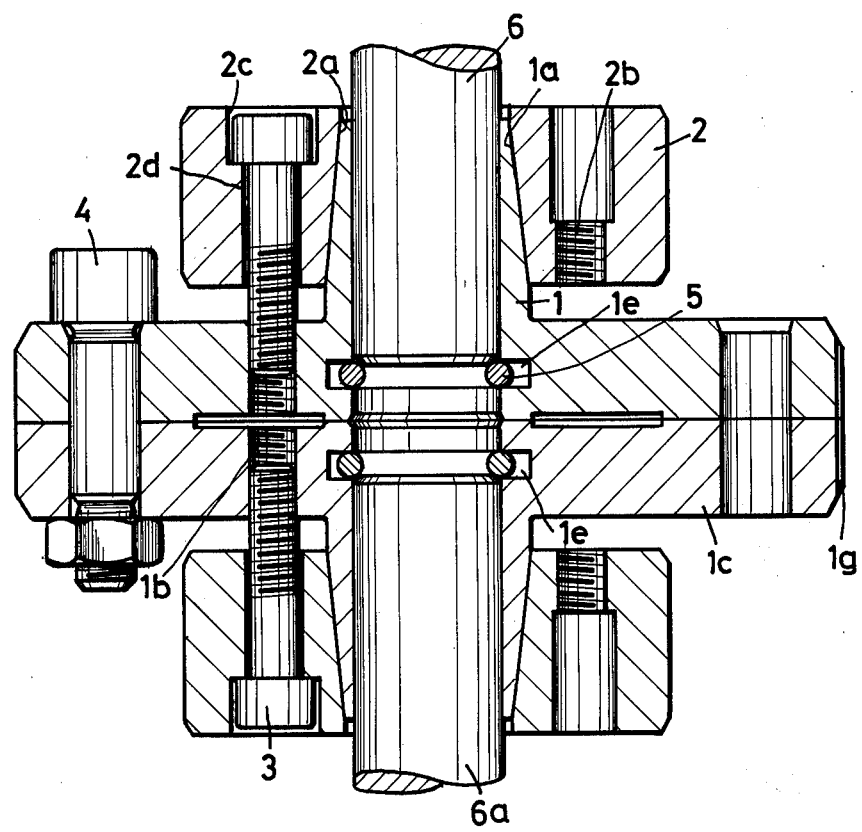
FIG. 4 is a view similar to FIG. 1 but of an additional embodiment.

A further embodiment is shown in FIG. 4. It corresponds, as to structure and function, almost exactly to the one in FIGS. 1 and 2, with the following exceptions.

Sleeve 1 with its flange 1c is in this embodiment constructed of two axially mirror-symmetrical parts. The flange 1c is therefore of two halves which axially abut one another. Radially outwardly of the tapped bores 1b the flange 1c is provided with circumferentially spaced (two or more) passages through which bolts 4 extend which connect the flange halves together by cooperation with the illustrated nuts. Each of the sleeve halves in this embodiment has the groove 1e and spring ring 5 described with reference to FIG. 3.

The embodiment of FIG. 4 is especially advantageous, for example, where a center shaft is located between and coupled to two axially spaced other shafts, because it permits the the center shaft to be removed and installed without having to disengage the respective couplings from the two other shafts. To permit reinstallation in the same angular position as before, the flange 1c may be provided with a mark at its outer circumference, e.g., the axial notch 1g shown in FIG. 4.

All embodiments offer the possibility of adjusting the degree of compression of each sleeve end portion separately, i.e. to the same extent, or to a lesser or greater extent than for the other end portion. This greatly simplifies the installation of the coupling, especially where heavy shafts are involved. If this is not needed, however, then the bores 1b of flange 1c could be made smooth, the holes 2d in one ring 2 could be tapped and those in the other ring 2 smooth, and the bolts 3 could be larger and extend from one to the other ring through the smooth bores in flange 1c.

The holes 2b could be omitted if the cone angles of the surfaces 1a, 2a are such that upon removal of the bolts 3 the rings 2 will slide off the sleeve by themselves, instead of having to be pressed off.

The use of the radial bore 1d or its functional equivalent in FIG. 3 eliminates the need to measure the extent to which a shaft has been inserted into the sleeve 1. The outer axial sides of the rings 2 are advantageously provided (about the holes 2d) with recesses into which the heads of the bolts 3 can enter, to reduce the danger of accidents.

The sleeve 1 is relatively thin-walled and can be readily compressed and deformed to establish the desired frictional connection with the shafts. Axially applied forces act largely directly for obtaining the requisite surface-to-surface contact between sleeve and shafts so that even a relative small number of bolts 3 (see e.g. FIG. 2) produces contact pressure which is sufficient to transmit a high torque moment. The pressure rings are essentially subject only to the tensile stresses required to produce this torque moment, not to additional stresses.

While the invention has been illustrated and described as embodied in a coupling for shafts and the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A coupling for shafts and the like, comprising a sleeve having a passage adapted to receive the end portions of two aligned shafts, an outer circumferential surface having two axially spaced sections which conically diverage towards each other, and a radial flange intermediate said sections, said sleeve including said flange being of two axially adjacent parts which are mirror-symmetrical with reference to a radial parting line bisecting said flange midway between the axial ends of said flange; connecting means including threaded connectors connecting the parts of said flange to one another in axially aligned relationship; a pair of circumferentially uninterrupted pressure rings each surrounding one of said sections and each having a conically tapering inner circumferential surface complementary to the respectively surrounded section; and means connecting each of said pressure rings with said flange, and operative for pulling said pressure rings in opposite directions axially towards each other and towards said flange to thereby compress said sleeve radially inwardly into frictional engagement with shaft end portions located in said passage.

2. A coupling as defined in claim 1, wherein said flange is provided with circumferentially spaced tapped bores, and said connectors are bolts connected to the respective rings and threaded into said bores.

3. A coupling as defined in claim 2, wherein each of said bores has two oppositely facing open ends, and wherein bolts from each of said rings are threaded into the respective open ends of each of said bores.

4. A coupling as defined in claim 2, wherein said flange has opposite axial ends and is provided substantially midway between said ends with a radial bore which opens into said passage so as to permit inspection of the respective ends of said shaft end portions.

5. A coupling as defined in claim 2, wherein each of said rings has a plurality of circumferentially spaced smooth holes and an axial endface directed away from said flange, said bolts extending through the respective holes and having heads which bear upon the respective axial endface.

6. A coupling as defined in claim 2, wherein said rings each have at least two circumferentially spaced tapped holes located opposite uninterrupted portions of said flange so that, when respective bolts are threaded into said tapped holes and bear upon said flange, requisite turning of said bolts results in dislodging of said rings from said sections.

7. A coupling for shafts and the like, comprising a sleeve having a passage adapted to receive the end portions of two aligned shafts, an outer circumferential surface having two axially spaced sections which conically diverge towards each other, and a radial flange intermediate said sections, said passage being bounded by an inner circumferential surface and the latter being formed substantially midway between the ends of said sleeve with a circumferentially extending groove; a pair of pressure rings each surrounding one of said sections and having a conically tapering inner circumferential surface complementary to the respectively surrounded section; means connecting said pressure rings with said flange, and operative for pulling said pressure rings axially towards each other and towards said flange to thereby compress said sleeve radially inwardly into frictional engagement with shaft end portions located in said passage; and a circumferentially incomplete springring received in said groove in part projecting radially inwardly beyond the same and acting as an abutment for said shaft end portions, said spring ring being dimensioned to enter fully into said groove in response to axial pressure so as to permit sliding of said sleeve on said shaft end portions.

* * * * *